(12) United States Patent
Sweatt et al.

(10) Patent No.: US 7,286,295 B1
(45) Date of Patent: Oct. 23, 2007

(54) MICROOPTICAL COMPOUND LENS

(75) Inventors: William C. Sweatt, Albuquerque, NM (US); David D. Gill, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 195 days.

(21) Appl. No.: 11/290,050

(22) Filed: Nov. 30, 2005

(51) Int. Cl.
*G02B 27/10* (2006.01)

(52) U.S. Cl. ............... 359/619; 359/725; 359/754; 385/116; 385/119; 348/340

(58) Field of Classification Search ............... 359/619, 359/620, 720, 725, 754; 385/116, 119; 348/340
See application file for complete search history.

(56) References Cited

U.S. PATENT DOCUMENTS 6,954,310 B2 * 10/2005 Holloway et al. .......... 359/619

FOREIGN PATENT DOCUMENTS

| EP | 1 270 026 A | 1/2003 |
|---|---|---|
| JP | 60 045516 A | 3/1985 |
| JP | 60 011421 A | 1/2004 |
| WO | 00/10552 | 3/2000 |
| WO | 2004/098522 | 11/2004 |
| WO | 2004/110380 | 12/2004 |
| WO | 2005/110435 | 11/2005 |
| WO | 2006/019591 | 2/2006 |
| WO | 2006/036813 | 4/2006 |

OTHER PUBLICATIONS

A. W. Lohmann, "Scaling laws for lens systems," Applied Optics, vol. 28, No. 23, Dec. 1, 1989, 4996-4998.
R. Volkel, "Miniaturized imaging systems," Microelectronic Engineering 67-68 (2003) 461-472.
J. Duparre, "Thin compound-eye camera," Applied Optics, vol. 44, No. 15, May 20, 2005, 2949-2956.
J. Duparre, "Artificial compound eyes—different concepts and their application to ultra flat image acquisition sensors," Proc. of SPIE, vol. 5346, 2004, 89-100.
R. Hornsey, "Electronic Compound-Eye Image Sensor: Construction and Calibration," SPIE-IS&T, vol. 5301, 2004, 13-24.
J. S. Sanders, "Design and analysis of apposition compound eye optical sensors," Optical Engineering, vol. 34, No. 1, Jan. 1995, 222-235.
M. F. Land, "Animal Eyes," Oxford University Press, (2002) 122-155.
D. P. Adams, "Focused ion beam milling of diamond: Effects of H20 on yield, surface morphology and microstructure," J. Vac. Sci. Technol. B 21 (6), Nov./Dec. 2003, 2334-2343.
Wakasugi M., et al, "Vitamin D-3 Stimulates The Production of Prostacyclin by Vascular Smooth Muscle Cells", *Prostaglandins*, 42(2): 127-136 (1991).
Bennani Kabchi N., et al., "New Model of Atherosclerosis in Insulin Resistant Sand Rats: Hypercholesterolemia Combined with D2 Vitamin", *Atherosclerosis*, 150(1): 55-61 (2000).
Wu-Wong J.R., et al., "Cardiovascular Diease in Chronic Kidney Failure: The Role of VDR Activators", *Current Opinion in Investigational Drugs*, 7(3): 206-213 (2006).

* cited by examiner

*Primary Examiner*—Hung Dang
*Assistant Examiner*—Joseph Martinez
(74) *Attorney, Agent, or Firm*—Kevin W. Bieg

(57) ABSTRACT

An apposition microoptical compound lens comprises a plurality of lenslets arrayed around a segment of a hollow, three-dimensional optical shell. The lenslets collect light from an object and focus the light rays onto the concentric, curved front surface of a coherent fiber bundle. The fiber bundle transports the light rays to a planar detector, forming a plurality of sub-images that can be reconstructed as a full image. The microoptical compound lens can have a small size (millimeters), wide field of view (up to 180°), and adequate resolution for object recognition and tracking.

15 Claims, 3 Drawing Sheets

MICROOPTICAL COMPOUND LENS

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to microoptics and, in particular, to an microoptical compound lens for imaging an object.

BACKGROUND OF THE INVENTION

The growth of the microelectronic, microelectromechanical systems (MEMS), and optical fiber telecommunication industries has driven a need for microoptical systems. In particular, the miniaturization of security and defense systems has created a need for high precision micro- and meso-scale optical systems for miniature robotic navigation and vision systems, surety devices, verification sensors, handheld imaging systems, and portable chemical and biological detection systems. The compactness of microoptical systems offers the advantages of portability and increased functionality for many of these applications.

Conventional lenses have dimensions of several millimeters or more, with comparable working distances. Therefore, portable image-capturing systems require microoptical elements having dimensions of a millimeter or smaller. However, diffraction effects can drastically reduce the resolution and image quality of a microoptical lens. Further, optic limitations due to geometric aberrations must be overcome for diffraction-limited performance to be achieved. Whereas these aberrations can be mitigated in conventional lens systems using a train of multiple refractive lenses having weakly curved surfaces or lenses having aspheric surfaces, correcting aberrations becomes a major problem with microoptical systems. This is because packaging and alignment of multiple microoptical elements in a train is very difficult and fabricating aspheric microoptical surfaces is challenging.

Fortunately, nature has developed ways to overcome the limitations of miniature optics for spatial vision. Single-aperture eyes, such as the human eye, can provide high resolution, environmental scanning ability, focusing ability, color detection, and very large dynamic range to see both in the bright sunshine and in the dark night. However, single-aperture eyes are very massive and energy-consumptive for small creatures. As a result, small insects have adapted to the compound eye, comprising an array of small visual optical systems, or ommatidia, instead of a single large eye. A compound eye can occupy a very small volume by reducing the working distance of a large, single-aperture eye or a multi-element imaging system. Whereas the resolution of a compound eye is usually poor compared to the single-aperture eye, the poorer resolution is counterbalanced by additional functionality useful for the lifestyle of the insect. In particular, the compound eye can have a larger field-of-view (FOV), without requiring movement of the head or eye, for increased environmental awareness. As a result, insects use compound eyes to perform perceptually oriented tasks, such as obstacle avoidance, landmark recognition, searching for mates and food, and avoidance of predators. Furthermore, these tasks require only simple neural processing systems compared to humans. See R. Volkel et al., "Miniaturized imaging systems," *Microelect. Eng.* 67-68, 461 (2003); J. S. Sanders and C. E. Halford, "Design and analysis of apposition compound eye optical sensors,"*Optical Eng.* 34(1), 222 (1995); and M. F. Land and D. Nilsson, *Animal Eyes*, Oxford Univ. Press (2002).

The compound eye covers a large portion of the object space by capturing a wide FOV scene as multiple sub-images. Two different types of compound eyes exist in nature—the apposition and the superposition compound eyes. The apposition compound eye consists of an array of ommatidia, wherein the lenslet of each ommatidia focuses light from a small solid angle of object space onto a separate rhabdom. The rhabdom can comprise one or more photoreceptors that can have different spectral or polarization responses. Light absorbed by the rhabdom transmits a signal to the insect's brain through an optic nerve. With apposition eyes, there is no overlap of the inverted sub-images between different lenslets upon the same rhabdom. Apposition eyes can have hundreds or thousands of these ommatidia packed into a non-uniform hexagonal array, with each ommatidia pointing in a different direction. In the superposition compound eye, light from multiple lenslets combines on the surface of a photoreceptor layer to form a single erect image of the object. Apposition systems require less image processing power and have less stringent tolerances than do superposition systems, due to the non-overlapping of sub-images, but at the expense of loss of small portions of the full image at the ommatidia intersections. However, the superposition eye is much more light sensitive than the apposition eye due to the overlap of images from different facets on the same photoreceptor. Therefore, the superposition compound eye is found primarily on nocturnal insects and deep-water crustaceans.

However, the fabrication of high precision microoptical systems, especially artificial compound lenses, has been difficult. Previous microoptical compound lenses have used flat optical arrays with limited optical performance. For example, manufacturing techniques for refractive microoptical arrays have included reflow or melting resist techniques. Photoresist is microstructured by photolithography and melted. The lenslet profile is formed by surface tension during melting. The melted resist lens array can serve as a mold for subsequent replication in plastic. Such planar arrays permit accurate alignment and wafer level manufacturing. However, the planar nature of these microfabricated arrays inherently sacrifices FOV and fabrication shortcomings and aberrations limit aperture size. An optical sensor having a thickness of 0.2 mm, a FOV of 20°×20°, and a resolution of 1.5 LP/deg was achieved using the planar arrays. See J. Duparre et al., "Artificial compound eyes—different concepts and their application to ultra flat image acquisition sensors," *Proc. of SPIE* 5346, 89 (2004); and J. Duparre et al., "Thin compound-eye cameras," *Appl. Optics* 44(15), 2949 (2005).

A three-dimensional compound lens has been constructed, comprising a mechanical 'dome' structure covered with 'eyelet' lenses coupled to a coherent fiber bundle that brings the image to a detector array. The 100-mm-diameter dome comprised 25 eyelet lenses, each with a 15 mm focal length and 6 mm effective diameter, providing an azimuthal FOV of 150°. However, this 3D compound lens is far too large for many portable, meso- and micro-scale applications. See R. Hornsey et al., "Electronic Compound-Eye Image Sensor: Construction and Calibration," *Proc. of SPIE* 5301, 13 (2004).

Therefore, a need remains for a microoptical compound lens that has a wide FOV and adequate resolution for object recognition and tracking.

SUMMARY OF THE INVENTION

The present invention is directed to a microoptical compound lens for imaging an object, comprising a segment of a hollow optical shell having an outer surface comprising a plurality of outer lenslets for collecting light from the object and an inner surface comprising a plurality of inner lenslets and wherein each outer lenslet is aligned on an ommatidial optical axis with a corresponding inner lenslet to provide a plurality of lenslet pairs; a spacing shell within the hollow optical shell for maintaining focus of the light rays along the optical axis of each lenslet pair; a coherent fiber bundle having a curved front surface that is concentric with the hollow optical shell and on which the light rays are focused, for transporting the focused light from each lenslet pair; and an detector for detecting the transported focused light from each of the lenslet pairs and forming an image of the object.

The hollow optical shell can be a transparent glass or plastic hemispherical shell. The lenslets can comprise aspherical and/or diffractive surfaces for improved image quality. The spacing shell can comprise an absorbing material with a plurality of holes cut therethrough along the optical axes of the lenslet pairs to remove stray incoming rays and prevent crosstalk between the optical paths of adjacent lenslet pairs. The coherent fiber bundle can comprise a plurality of single-mode optical fibers that are straight and parallel to the centerline of the bundle. Alternatively, the fibers can be bent so that the ommatidial axis is approximately coaxial with the fiber axis at the entry end of the bundle for each lenslet pair. Using bent fibers allows the bundle to have a larger numerical aperture, providing a larger overall FOV. Sub-images that are projected onto the front surface of the bundle are not scrambled and are presented, intact, at the detector end of the bundle. The detector is preferably planar and can be a semiconductor photodetector array, such as a high-density charge coupled device or CMOS image sensor.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
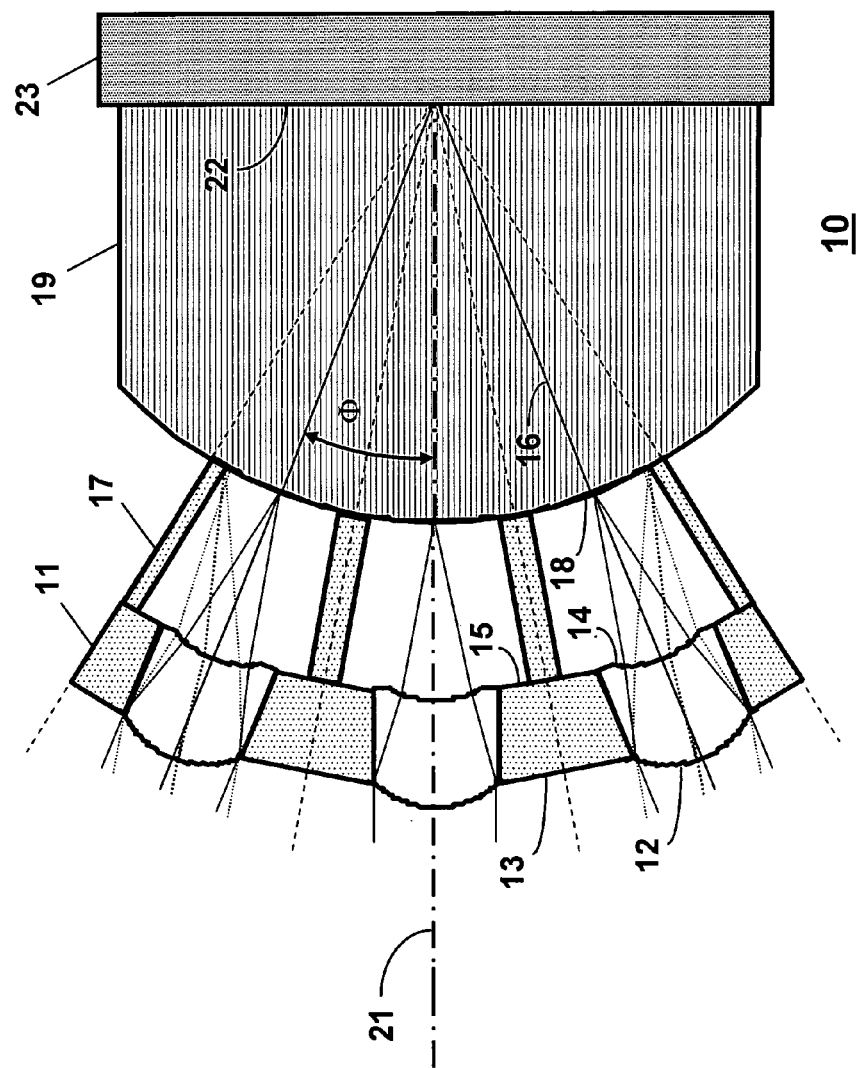
FIG. 1 shows a schematic side view illustration of a microoptical compound lens.

In FIG. 1 is shown an example of an apposition microoptical compound lens 10 having a plurality of artificial ommatidia for imaging light from an object. The lens 10 comprises a segment of a hollow, three-dimensional optical shell 11 with an array of lenslets formed on the inner and/or outer surfaces of the shell. Outer lenslets 12 on the outer shell surface 13 collect light from the object. The outer lenslets 12 can be precisely aligned on an ommatidial axis 16 with corresponding inner lenslets 14 on the inner shell surface 15. Each lenslet pair 12 and 14 is aligned on a separate ommatidial optical axis 16. The angle between the optical axes of two adjacent lenslet pairs is known as the interommatidial angle $\Phi$. The optical rays from each lenslet pair 12 and 14 are focused and create a sub-image on the curved front surface 18 of a coherent fiber bundle 19. The curved front surface 18 of the coherent fiber bundle 19 is concentric with the hollow optical shell 11. A curved spacer shell 17 provides optical pathways for the ommatidia and maintains optical path distance between the hollow optical shell 11 and the coherent fiber bundle 19 for focusing of the optical rays. The spacing shell 17 also removes stray incoming rays and prevents crosstalk between optical paths in the array. The spacing shell 17 can be made from an absorbing material with a plurality of holes cut therethrough along the ommatidial optical axes 16 to separate the adjacent beam bundles. The light that is incident on the front face 18 of the fiber bundle 19 is transferred as a plurality of sub-images to the front surface 22 of a planar detector 23 for data collection. The full image can be reconstructed from the collected sub-images.

The hollow optical shell 11 can be a hemispherical optical shell. The shell can be fabricated individually or as a mold insert for higher volume production. The shell 11 can comprise a transparent optical material, such as glass or polymer. Glass has good temperature resistance and its characteristics are well understood. Polymers, such as polymethylmethacrylate (PMMA), polycarbonate, or epoxies, are light weight, low cost, and easy to machine, but can have low heat tolerance for some applications. In particular, PMMA has good wavelength dispersion properties to minimize chromatic aberrations.

The lenslet surfaces can be designed to correct for primary aberrations, including spherical aberration, coma, and astigmatism, as well as to match the image plane curvature to that of the rounded front face 18 of the coherent fiber bundle 19. Preferably, the lenslets 12 and 14 comprise aspherical surfaces. Aspheres can improve the performance of a lens, particular for a fast, low-F-number lens, or for systems in which volume constraints limit the number of optical elements or surfaces. Generally, two aspherical surfaces are preferred to improve performance. The design freedom of aspheric surfaces allows the spot diameter to be reduced by an order of magnitude over the FOV of the microoptical compound lens. The lenslets 12 and 14 can further comprise diffractive surfaces. Diffractive surfaces allow better control of chromatic aberrations and some control of monochromatic aberrations. Such aspheric refractive and/or diffractive surfaces can be machined using diamond milling into the outer and inner surfaces 13 and 15 of the optical shell 11, to provide the outer and inner lenslets 12 and 14. Anti-reflection coatings can be applied, for example using atomic layer deposition, to the optical surfaces to decrease reflectance losses.

Each lenslet pair sub-images a segment of the scene onto the rounded front face 18 of the coherent fiber bundle 19. For a whole image to be in focus, each lenslet pair must create a sub-image on a convex surface—the curved front surface of the coherent fiber bundle. The coherent fiber bundle 19 is comprised of single-mode optical fibers that can be straight and parallel to the centerline of the bundle. However, the requirement for light guiding in a fiber limits the acceptance angle from which light rays entering the fiber can deviate from the axis of the fiber. This light guiding requirement limits the overall FOV of the compound lens when using a bundle 19 having straight and parallel fibers. Alternatively, the fibers can be bent so that the ommatidial axis 16 is coaxial with the fiber axis at the entry end 18 of the bundle 19 for each lenslet pair and perpendicular to the planar interface 22 at the detector end. Such a fiber bundle comprising bent fibers has a larger numerical aperture (NA), providing a larger overall FOV for the compound lens. Regardless of whether the fibers are parallel or bent, if the fibers are mutually aligned sub-images that are projected onto the entry end 18 of the fiber bundle are not scrambled and are presented, intact, at the detector end 22 of the bundle. For a radially symmetric compound lens, the optical axis 21 of the compound lens can be coaxial with the centerline of the fiber bundle 19. The planar end 22 of the fiber bundle 19 can be bonded to the planar detector 23. Alternatively, the end 22 of the fiber bundle need not be planar, and a non-planar detector 23 can be used. The detector 23 can be a semiconductor photodetector array, such as a high-density charge coupled device (CCD) or CMOS image sensor. The detector 23 will thus register a distorted but intact sub-image of the scene viewed by each lenslet pair.

Figure 2:
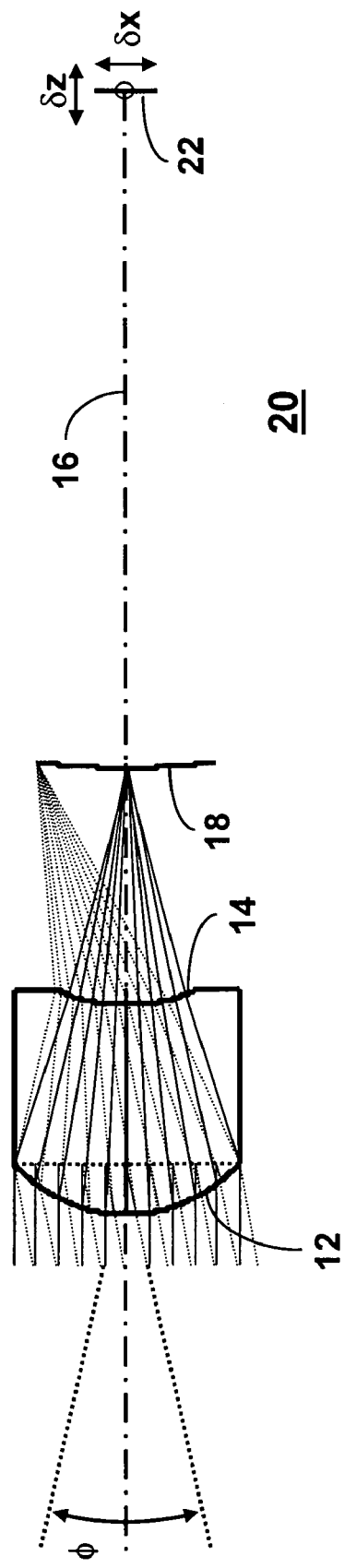
FIG. 2 shows a schematic side view illustration of a single ommatidium of the microoptical compound lens.

The design of the compound lens is a compromise between optical system size, resolution, and FOV. The resolution of the compound lens 10 is determined by the number of ommatidia, optical diffraction blur and aberration blur of the lenslets, diameter of the fibers in the fiber bundle, and density and size of the detector pixels. In FIG. 2 is shown a single artificial ommatidium 20 extracted from a hemispherical compound lens 10. The rays of light of wavelength $\lambda$ form an inverted image on the hemispherical surface 18 of the fiber bundle. The F-number of a lenslet pair 12 and 14 is given by $F=f/D$, where f is the focal length and D is the lenslet diameter. Therefore, a small volume compound lens generally indicates a fast, low F-number lenslet pair. The diffraction limited resolution of a lenslet is given by $\delta x \sim \lambda F$ and the depth of focus by $\delta z \sim 4\lambda F^2$. Both the resolution and depth of focus are independent of size for an equal F-number and wavelength. Therefore, downscaling of a diffraction-limited lens does not change the size of an image pixel. Small diameter lenses have fewer off-axis aberrations (e.g., coma, astigmatism, and distortion) than large lenses, because aberrations are a strong function of angle and lens diameter. However, reducing the aberration blur solely by reducing the aperture increases the F-number and, therefore, the diffraction blur. See R. Volkel et al., "Miniaturized imaging systems," *Microelectronic Engineering* 67-68, 461 (2003); and A. W. Lohrman, "Scaling laws for lens systems," *Appl. Optics* 28(23), 4996 (1999).

To maintain resolution through the system, the spot size produced by a lenslet is preferably similar in size, or smaller than, the pixel size of the detector. The spacing of the fibers in the coherent fiber bundle can also degrade the image. The fiber spacing is preferably smaller than or equal to the pixel spacing of the detector.

To observe an object or scene requires wide-angle observation ability, in addition to adequate resolution. The array of ommatidia around the hemisphere allows the compound lens to have a wide FOV and remain stationary without the need to rotate and track objects. Each ommatidium 20 has a FOV, or acceptance angle $\phi$, that is the maximum inclination of incoming rays from the ommatidial axis. The spacing of the ommatidia around the hemisphere can be chosen such that each sub-image has overlapping data with surrounding ommatidia, or so that the data from each lenslet pair is sub-imaged at only one location. The width of the angular acceptance and the amount of overlap of neighboring ommatidia effect the limiting resolution of the compound lens as a whole. If the fields of view of multiple ommatidia overlap, every point in object space will be covered by at least one ommatidium. The typical apposition eye of an insect has an acceptance angle $\phi$ that is approximately the same as the interommatidial angle $\Phi$, such that the FOV of each ommatidium apposes (abuts) the FOV of the adjacent ommatidia. Therefore, the detector can detect a set of non-overlapping images. The non-overlapping compound eye loses some information and reveals a more pixilated (lower resolution) image, but the image is very easy to reconstruct due to its low number of pixels and lack of pixel overlap. Non-overlapping of ommatidia sub-images is especially useful for tracking motion. Object motion is detected as an image changing from pixel field to pixel field if moving perpendicular to the optical axis, or as appearing in an increasing number of pixel fields if coming toward the lens.

The overall FOV of the observed scene is related to the total number of non-overlapping ommatidia. With a hemispherical cross-section and a fiber bundle comprising bent fibers, the overall FOV can be 180°. If the compound lens is a hemisphere, or section thereof, and the lenslet pairs have equal aperture and optical axes with uniform interommatidial angles, the compound lens will sample the visual environment with equal density. However, spherical symmetry, uniform interommatidial spacing, and uniform lenslet aperture size are not required. For example, many insects have non-hemispherical compound eyes with non-uniform ommatidia to provide greater directional sensitivity.

Design of a Microoptical Compound Lens

As an example of the present invention, a very small compound lens with an overall ±45° FOV was designed using the ZEMAX® optical design and analysis software (ZEMAX Development Corporation, Bellevue, Wash.). The overall system was about 2.6 mm long. The compound lens was designed to be used with $\lambda=1.06$-μm laser illumination and a 3×4-mm CCD camera. As will be described below, the lens can be fabricated with diamond milling in clear PMMA plastic. The optical shell was a 5-mm diameter segment of a 3.3-mm radius PMMA shell and contains forty lenslets in a hemispherical array. To match the size of the CCD camera, a 2-mm radius image plane was used. The spot size produced by a lenslet is preferably similar in size, or smaller than, the pixel size of the detector. The fiber spacing is preferably smaller than or equal to the pixel spacing of the detector. The CCD camera used in the design had a pixel size of 3 μm. The optical fiber bundle comprised straight and parallel 6-μm-diameter fibers. The NA of the fiber bundle was 0.53. The lenslet focal spot size was about 7 μm. In general, a lenslet pair can be designed to minimize the spot size using ZEMAX®, and then the design can be adjusted to minimize the RMS optical path difference (OPD) and wavefront error. Minimization of the OPD sharpens the image, but at the expense of some flaring. A lenslet pair was designed to provide a small spot size over a 20° FOV using aspheric surfaces. The F/number of the lenslet pairs was F/2.1. The diameter of the front lenslet was 0.76 mm. The distance from the surface of the front lenslet to the front surface of the fiber bundle was 1.3 mm. The thickness of the PMMA hemispherical shell was 0.61 mm. The thickness of the spacer was 0.67 mm. The lenslets of each pair are preferably coaxial to less than 1 μm. The spacing between the outer and inner lenslet surfaces can vary from the ideal by about 2 μm without significantly degrading the image quality.

Each lenslet pair sub-imaged about 20° of the scene onto the rounded front face of the coherent fiber bundle. The lenslets were distributed in the array to fit side-by-side with a few microns of space between the sub-images formed on the curved front face of the fiber bundle. The focal length of the system was chosen such that each ommatidia would fit in a $\Phi=18°$ segment of the hemispherical optical shell and could see the $\phi=20°$ FOV with no overlap on the curved front surface of the fiber bundle. Therefore, there were no unseen spots in the overall FOV of the compound lens. The optical fiber bundle transfers the sub-images to the CCD attached to the flat back surface. Each lenslet pair creates a non-overlapping sub-image and these sub-images can be stitched back together using software to reassemble the image of the full 90° field.

The computed image quality was quite good. The Strehl ratio is the ratio of the peak intensity in the diffraction pattern of an aberrated point image to the peak intensity in the diffraction pattern of the same aberration free point image for a lenslet. The computed Strehl ratio was greater than 85% over the whole field. Alternatively, the overall image quality can be expressed as a modulation (contrast) transfer function (MTF), which is affected by both diffraction and geometric aberrations. The MTF expresses the ratio of the modulation in the image to the modulation in the object for a sinusoidal object as a function of frequency in line pairs per millimeter. For the compound lens design, the MTF was greater than 65%, providing a resolution of 100-line-pairs/mm or less. If the front lenslet surfaces are made spherical, the image quality (MTF@100-lp/mm) is degraded from 65% to about 50%. With both lenslet surfaces spherical, the MTF@100-lp/mm drops to zero. The design can be used with white light with only modest degradation of image quality. If the bandwidth is 400 nm about the 1.06-μm-center wavelength, the image degradation increases the RMS spot size by less than 30% over the FOV.

The microoptical compound lens described above has the same diameter as a conventional wide FOV lens. However, a conventional lens system with the same FOV and resolution as the microoptical compound lens would be quite long—about ten times the focal length. Also, a typical wide FOV conventional lens system contains at least six lenses that must be aligned and centered to about a micron.

Fabrication of a Microoptical Compound Lens

Correcting for aberrations in the compound lens requires aspheric optical surfaces. Fabricating aspheric surfaces has been difficult, limiting their use even in conventional optical systems. However, diamond milling can be used to make aspheric surfaces on lenses that are only a fraction of a millimeter in diameter. Diamond milling is distinct from single-point diamond turning (SPDT), which is commonly used for cutting macroscopic optics (e.g., dimension greater than one millimeter). In SPDT, a diamond cutter with a small convex radius moves on a programmed path and cuts the surface, as is done in ordinary machining. The size of the cutting tools limits the usefulness of SPDT when machining sub-millimeter lenses. Conversely, in diamond milling, the surface of the lens is cut using an "end mill," a tool that is pre-shaped to the radial profile of the final lens. The tool is rotated about the axis of the desired lens, so when it is moved (on axis) toward the work piece, the tool cuts a radially symmetric lens surface. Very accurate surfaces can be created using diamond milling. Interferometric measurements indicate that a figure error of 25 nm RMS and a surface microroughness of about 1-nm RMS can be obtained in acrylic polymers—both quite sufficient for 1-μm light.

Diamond end mill tools for cutting spherical surfaces are commercially available. These tools can be used to create spherical lenses, or they can be reshaped to an aspheric profile using focused ion beam (FIB) milling. Using FIB milling, micron-scale features can be precisely shaped with nanometer precision in diamond tools. FIB systems maintain a small beam size, excellent beam positioning accuracy, large depth of focus and stable operating conditions. When combined with a multiaxis stage having rotation, FIB milling can be used to sculpt geometrically complex diamond cutting tools. Recently, advances have been made to improve the ion beam machinability of diamond to enable reasonable removal rates for this chemically inert and hard tool material. The FIB process can remove material from a synthetic monocrystalline diamond tool at a rate of about 2.5 μm³/sec using $H_2O$-assisted ion milling. See D. P. Adams et al., *J. Vac. Sci. Technol. B*21(6), 2334 (2003), which is incorporated herein by reference.

Figure 3:
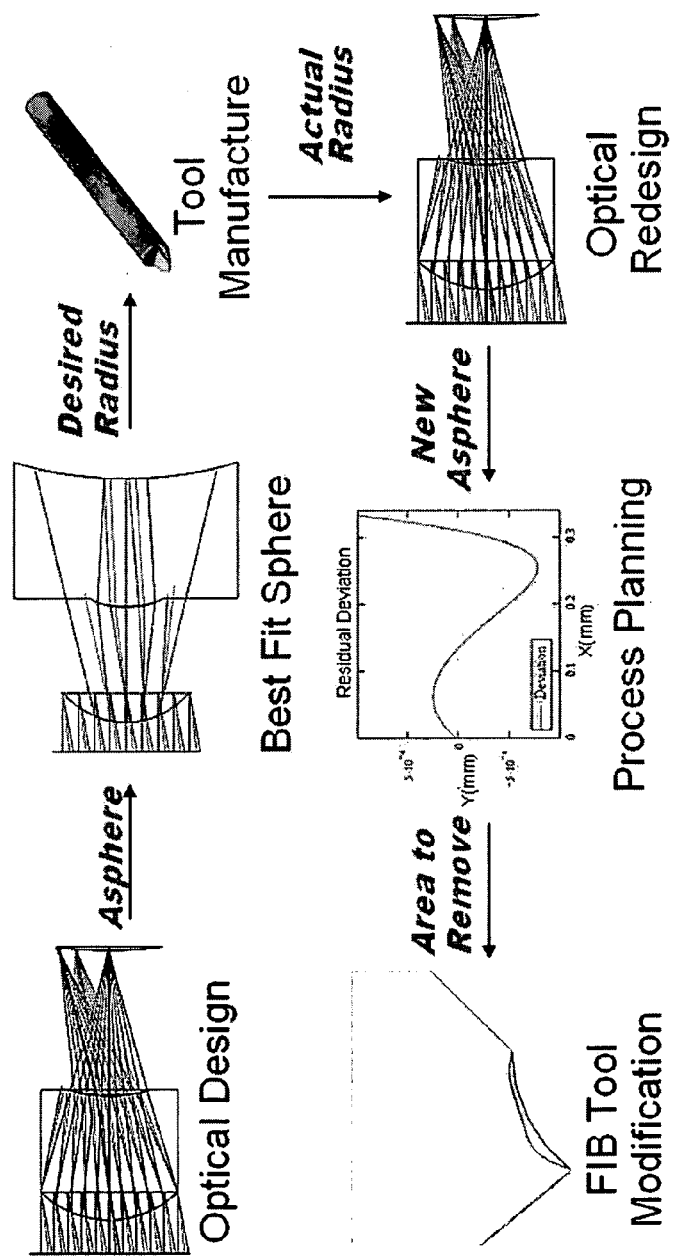
FIG. 3 shows a diagram of a process for modifying a diamond tool using focused ion beam milling to cut aspheric surfaces.

A process for modifying a diamond tool is shown in FIG. 3. The optical design is used to find the "inscribed", concave, best fit sphere. The inscribed best fit sphere is utilized such that there is additional material on the tool that can be removed by the FIB process. The design is sent to the tool manufacturer who creates a tool, generally with a radius tolerance for concave spheres on the order of +/−10 μm. When the spherical tool is made, the actual tool radius is measured and the lens is redesigned, if necessary, to accommodate the actual tool radius. The geometric definition of the new aspheric profile is then analyzed in comparison to the tool's spherical radius profile and the residual deviation is calculated. This can be done in a number of ways by changing the position of the aspheric profile on the tool's spherical profile to optimize for either minimum volume of total material removed or minimum deviation in material to be removed across the whole profile. The residual deviation is then converted into a geometry-description file for the FIB process software to follow in milling the edge of the diamond tool. The final tool is then analyzed for resulting edge radius, profile accuracy, and surface finish.

The microoptical compound lens design described above requires that forty 760-μm diameter aspheric lenslets be arrayed around the surface of a 3.3-mm radius hemispherical shell. An outer lenslet can be machined by moving the diamond mill machine axis to align with the ommatidium axis of the lenslet. The shell is held stationary while the outer lenslets are sequentially machined. The shell is then inverted and forty aspheric lenslets are machined on the inside of the shell with alignment tolerances to the outside lenslets of 1 μm true position. This method allows accurate and simultaneous alignment of the concave lenslet surfaces on the outer hemisphere with the convex lenslet surfaces on the inner hemisphere. Because the lenses are arrayed around the hemispherical shell, SPDT would require that the shell be repositioned 40 times to allow for on-axis machining. $PDT can provide the best form accuracy and surface finish, but positional accuracy is difficult to maintain through the large number of relocations of the shell.

The present invention has been described as a microoptical compound lens. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A microoptical compound lens for imaging an object, comprising:
   a segment of a hollow optical shell having an outer surface comprising a plurality of outer lenslets for collecting light from the object and an inner surface comprising a plurality of inner lenslets and wherein each outer lenslet is aligned on an ommatidial axis with a corresponding inner lenslet to provide a plurality of lenslet pairs;
   a spacing shell within the hollow optical shell for maintaining focus of the light rays along the optical axis of each lenslet pair;
   a coherent fiber bundle having a curved front surface that is concentric with the hollow optical shell and on which the light rays are focused, for transporting the focused light from each lenslet pair; and
   a detector for detecting the transported light from each of the lenslet pairs and forming an image of the object.

2. The compound lens of claim 1, wherein the hollow optical shell comprises a hemispherical shell.

3. The compound lens of claim 1, wherein the hollow optical shell comprises a transparent optical material.

4. The compound lens of claim 1, wherein the transparent optical material comprises glass or polymer.

5. The compound lens of claim 4, wherein the polymer comprises polymethylmethacrylate, polycarbonate, or epoxy.

6. The compound lens of claim 1, wherein at least one of the outer lenslets comprises an aspherical surface.

7. The compound lens of claim 1, wherein at least one of the outer lenslets comprises a diffractive surface.

8. The compound lens of claim 1, wherein at least one of the inner lenslets comprises an aspherical surface.

9. The compound lens of claim 1, wherein at least one of the outer lenslets comprises a diffractive surface.

10. The compound lens of claim 1, wherein the spacing shell comprises an absorbing material with a plurality of holes cut therethrough along the optical axes of the lenslet pairs to remove stray incoming rays and prevent crosstalk between the optical paths of adjacent lenslet pairs.

11. The compound lens of claim 1, wherein the coherent fiber bundle comprises single-mode optical fibers that are straight and parallel to the centerline of the bundle.

12. The compound lens of claim 1, wherein the fibers of the coherent fiber bundle are bent so that the ommatidial axis is approximately coaxial with the fiber axis at the entry end of the bundle for each lenslet pair.

13. The compound lens of claim 1, wherein the detector is planar.

14. The compound lens of claim 1, wherein the detector comprises a semiconductor photodetector array.

15. The compound lens of claim 14, wherein the semiconductor photoconductor array comprises a charge coupled device or CMOS image sensor.

* * * * *